United States Patent Office 3,046,245
Patented July 24, 1962

3,046,245
PREPARATION OF CRYSTALLINE POLYSTYRENE SOLUTIONS
Roland J. Kern, Miamisburg, and Allen S. Kenyon, Dayton, Ohio, assignors to Monsanto Chemical Company, St. Louis, Mo., a corporation of Delaware
No Drawing. Filed Jan. 15, 1957, Ser. No. 634,164
12 Claims. (Cl. 260—30.4)

This invention relates to polystyrene, and more particularly to that type of polystyrene known as "isotactic" or "crystalline" polystyrene. More specifically, the invention relates to methods for making solutions of crystalline polystyrene.

The term "isotactic" (or "isotactical") as applied to polystyrene refers to a particular type of the polymer having a molecular configuration such that it can exist in a crystalline form. (See G. Natta, Journal of Polymer Science, 16, 143–154 (1955).) The crystalline nature of isotactic polystyrene has been attributed to a stereospecific configuration of asymmetric carbon atoms in the polystyrene chain. The appropriate stereospecificity is apparently obtained only with particular polymerization techniques and/or with the use of specific types of polymerization catalysts. Examples of such polymerization processes are described by Williams et al., Journal of the American Chemical Society, 78, 1260 (1956) (including the Morton reference cited as footnote (3) in the Williams et al. article), and in the copending application Serial No. 498,254, filed March 31, 1955, by one of the inventors of the present invention.

Crystalline polystyrene has several unique advantages over conventional amorphous polystyrene, particular advantages being greater tensile strength (especially in oriented films and fibers) and much higher heat distortion temperature. Up until the present time, extensive evaluation and commercial development of crystalline polystyrene has been considerably hampered by the fact that it is substantially insoluble in all known solvents, thus making it very difficult to measure molecular weights, spin fibers cast films, etc.

We have now found a special process whereby crystalline polystyrene can be dissolved in any solvent which will dissolve conventional amorphous (as distinguished from isotactic) polystyrene. This process involves heating the crystalline isotactic polystyrene to a temperature above the melting point of the crystals or crystallites therein, and then quenching or cooling sufficiently rapidly to produce a solid amorphous isotactic polystyrene. The amorphous isotactic polystyrene can then be dissolved in any of the solvents in which conventional (i.e., non-isotactic) polystyrene will dissolve. In other words, we have found that crystalline isotactic polystyrene can be made amorphous by rapidly cooling from a temperature above its crystal melting point temperature—and that for purposes of forming solutions it then behaves substantially the same as conventional polystyrene. The isotactic polystyrene solutions prepared by this technique are stable at room temperature for indefinitely long periods of time. Upon precipitation from such solutions, the isotactic polystyrene reverts to its crystalline form—in which form it is again found to be insoluble in all known solvents.

The temperature at which the crystals or crystallites in isotactic polystyrene will melt has been found to be around 230° C. Thus, isotactic polystyrene above that temperature will always be non-crystalline. As the temperature is lowered below 230° C., there is a marked tendency toward crystallization. This tendency increases with decreasing temperature to about 180° C., at which temperature the rate of crystallization appears to be at a maximum. As the temperature is further lowered beyond 180° C., the rate of crystallization decreases and becomes negligible at around 110° C. or lower. Thus, in quenching isotactic polystyrene according to the present invention, the polystyrene should be cooled from a temperature above about 230° C. to a temperature below about 110° C. at a rate sufficiently fast to prevent development of any appreciable crystallinity, i.e., to prevent development of sufficient crystallinity to again make the polystyrene insoluble.

The required cooling rate can be readily achieved without unduly severe cooling conditions. For example, when dealing with relatively small cross sections (e.g., a filament of 1 mm. or less diameter) merely exposing to air at room temperature will give a sufficiently fast cooling rate. With larger cross sections more vigorous cooling methods (e.g., forced air or gas, or cooled gases or liquids) may be necessary. The suitability of any particular cooling conditions can be readily determined by trial and error. If one method of cooling allows crystal development, the severity of cooling conditions should be increased until crystallization is avoided. The degree of crystallinity developed can be determined by various methods, such as by X-ray diffraction. An approximation of crystallinity can be obtained by measuring the density of the solid polymer—since it has been found that density varies approximately linearly with crystallinity. Thus, the density (1.050 grams per cc. at 0 percent crystallinity) increases about 0.007 gram per cc for each 10% increase in crystallinity.

The terminology "a solvent which will dissolve conventional amorphous polystyrene" as used herein is intended to refer to solvents which are miscible with conventional amorphous polystyrene at room temperature—i.e., about 25° C. or 30° C. Preferred solvents are those boiling below about 160° C., since these solvents are relatively more volatile and consequently easier to remove by evaporation after the polymer has been processed. However, it is not necessary to remove the solvent by evaporation, since this removal can generally be done as well, and often better, by precipitation methods. A convenient precipitation technique is that of adding a precipitating agent—e.g., a liquid which is miscible with the polystyrene solvent but which is not itself a solvent for polystyrene (either isotactic polystyrene or conventional polystyrene). Water or other aqueous solutions are particularly desirable precipitating agents, especially for use in solution spinning techniques. Consequently, a preferred embodiment of the present invention involves the use of water-soluble polystyrene solvents.

Materials which will dissolve conventional amorphous polystyrene are generally well known to those skilled in the art. (See, for example, Boundy and Boyer, "Styrene, Its Polymers, Copolymers and Derivatives," Reinhold Publishing Co., New York (1952).) These materials include various aromatic compounds, heterocyclic compounds, ethers, ketones, esters and many others. Examples of such solvents are benzene, toluene, ortho-, meta-, and para-xylene, isopropyl benzene, chlorobenzene, benzyl chloride, morpholine, thiophene, pyridine, pyrrole, tetralin, tetrahydrofuran, dioxane, propylene oxide, diethyl ether, n-dipropyl ether, methyl ethyl ketone, methyl n-amyl ketone, butanone, cyclohexanone, isophorone, mesityl oxide, ethyl acetate, n-butyl acetate, isobutyl acetate, ethyl laurate, isoamyl laurate, benzyl acrylate, iodomethane, dibromomethane, dichloromethane, bromoform, trichloroethylene, carbon tetrachloride, chloroform, dichloroethane, ethylene monobromide, ethylene monochloride, acetal, carbon disulfide, phenylhydrazine, dimethylformamide, dimethylacetamide and many others. Such solvents can be used either alone or in miscible mixtures of two or more.

According to the present invention, useful solutions can be prepared containing from as low as 2 or 3 weight percent isotactic polystyrene to as high as 40 or 50 weight percent isotactic polystyrene—although the solutions will be quite viscous at the latter relatively high concentrations. Preferred concentrations of solutions are those containing between about 5 weight percent and about 25 weight percent of isotactic polystyrene. The various polystyrene solutions described herein are useful for solutions, spinning of fibers, casting of films, etc.

As mentioned above, isotactic polystyrene can vary in degree of crystallinity. The present invention is particularly concerned with dissolving crystalline polystyrene containing at least one or two percent of crystallinity—since the presence of even this small degree of crystallinity will make the polystyrene substantially non-dissolvable by conventional procedures. In general, it will be preferred to use polystyrene containing between about 5 and about 50 percent crystallinity in order to take full advantage of the unique properties attributable to such crystallinity.

The following examples will serve to illustrate further details of the practice and application of the present invention:

*Example*

A sample of crystalline isotactic polystyrene was heated to about 270° C. and then cooled rapidly to form a clear transparent sheet of amorphous isotactic polystyrene substantially free of crystallinity. One gram portions of this amorphous solid isotactic polystyrene were placed in 20 cc. of three different polystyrene solvents (chloroform, benzene and dioxane) in each of three different bottles and left overnight on a rotating wheel agitator. In each case, the polystyrene dissolved to form thick, clear, viscous solutions.

We claim:

1. The method of preparing a solution of at least about 2 weight percent of isotactic polystyrene, which method comprises heating crystalline polystyrene to a temperature above the melting point of the crystalline portion thereof and below the decomposition point of the polystyrene, cooling said polystyrene to a temperature below about 110° C. at a rate sufficiently rapid to obtain an amorphous isotactic polystyrene having less than one percent crystallinity, and thereafter dissolving said polystyrene in between about 1 and about 49 times by weight of a solvent which will dissolve conventional amorphous polystyrene.

2. The method of preparing a solution of at least about 5 weight percent of isotactic polystyrene, which method comprises heating crystalline polystyrene to a temperature above about 230° C., cooling said polystyrene to a temperature below about 110° C. at a rate sufficiently rapid to obtain an amorphous isotactic polystyrene having less than one percent crystallinity, and thereafter dissolving said polystyrene in between about 3 and about 19 times by weight of a solvent which will dissolve conventional amorphous polystyrene.

3. The method of claim 2, wherein the solvent is an aromatic solvent.

4. The method of claim 2, wherein the solvent is an aromatic hydrocarbon solvent.

5. The method of claim 2, wherein the solvent is benzene.

6. The method of claim 2, wherein the solvent is a water-miscible solvent.

7. The method of claim 2, wherein the solvent is dioxane.

8. The method of preparing a solution of at least about 5 weight percent of isotactic polystyrene, which comprises heating crystalline polystyrene to a temperature above about 230° C. and up to about 270° C., quench cooling the melted polystyrene to a temperature below about 110° C. and down to about room temperature at a rate sufficiently rapid to obtain an amorphous isotactic polystyrene having less than one percent crystallinity, and thereafter dissolving said polystyrene at room temperature in a solvent selected from the group consisting of benzene, toluene, ortho-, meta-, and para-xylene, isopropyl benzene, chlorobenzene, benzyl chloride, morpholine, thiophene, pyridine, pyrrole, tetralin, tetrahydrofuran, dioxane, propylene oxide, diethyl ether, n-dipropyl ether, methyl ethyl ketone, methyl n-amyl ketone, butanone, cyclohexanone, isophorone, mesityl oxide, ethyl acetate, n-butyl acetate, isobutyl acetate, ethyl laurate, isoamyl laurate, benzyl acrylate, iodomethane, dibromomethane, dichloromethane, bromoform, trichloroethylene, carbon tetrachloride, chloroform, dichloroethane, ethylene monobromide, ethylene monochloride, acetal, carbon disulfide, phenylhydrazine, dimethylformamide, and dimethylacetamide and suitable mixtures thereof.

9. The method of claim 8, wherein the solvent is toluene.

10. The method of claim 8, wherein the solvent is tetralin.

11. The method of claim 8, wherein the solvent is chlorobenzene.

12. The method of claim 8, wherein the melted polystyrene is extruded directly into air at room temperature and said extruded material has a maximum thickness of about 1 mm.

References Cited in the file of this patent

UNITED STATES PATENTS 2,581,922     Spencer _____ Jan. 8, 1952

FOREIGN PATENTS 503,973     Canada _____ June 29, 1954

OTHER REFERENCES

Williams: Journal of the American Chemical Society, volume 78, page 1260 (1956).